(12) United States Patent
Salomone et al.

(10) Patent No.: US 8,437,313 B2
(45) Date of Patent: May 7, 2013

(54) SCANNING METHODS AND APPARATUS FOR MOBILE DEVICES IN WIRELESS LOCAL AREA NETWORKS FOR REDUCED POWER CONSUMPTION

(75) Inventors: Leonardo Jose Silva Salomone, Ottawa (CA); Sherif Abdel-Kader, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 701 days.

(21) Appl. No.: 12/342,637

(22) Filed: Dec. 23, 2008

(65) Prior Publication Data

US 2010/0157864 A1 Jun. 24, 2010

(51) Int. Cl.
*H04W 4/00* (2009.01)
(52) U.S. Cl.
USPC ........... 370/332; 370/338; 370/341; 455/434; 455/436
(58) Field of Classification Search .................. 370/328, 370/329, 332, 333, 338, 341; 455/436, 434
See application file for complete search history.

(56) References Cited

U.S. PATENT DOCUMENTS

| | | | |
|---|---|---|---|
| 5,627,882 A | 5/1997 | Chien et al. | |
| 5,799,256 A | 8/1998 | Pombo et al. | |
| 6,804,542 B1 | 10/2004 | Haartsen | |
| 6,985,465 B2 | 1/2006 | Cervello et al. | |
| 7,047,185 B1 * | 5/2006 | Younes et al. | 704/201 |
| 7,146,151 B2 | 12/2006 | Arimitsu | |
| 7,480,521 B2 | 1/2009 | Abdel-Kader | |

(Continued)

FOREIGN PATENT DOCUMENTS

| | | |
|---|---|---|
| EP | 1069794 A2 | 1/2001 |
| EP | 1263254 A2 | 5/2002 |

(Continued)

OTHER PUBLICATIONS

Mary Narisetti, "Implementation of Vertical Handoff Algorithm Between IEEE 802.11 WLAN and CDMA Cellular Network", 2006.

(Continued)

*Primary Examiner* — Christopher Grey
(74) *Attorney, Agent, or Firm* — John J. Oskorep, Esq.

(57) ABSTRACT

One illustrative method for reducing power consumption in a mobile communication device of a wireless local area network (WLAN) involves the steps of identifying a communication signal quality value between the mobile device and a wireless access point of the WLAN with which the mobile device is currently associated; determining an initial timer value based on a predefined relationship with the communication signal quality value where, as the communication signal quality value decreases, the initial timer value correspondingly decreases; initializing a scan trigger timer with the initial timer value and running the scarf trigger timer; and upon expiration of the scan trigger timer: causing a scanning operation to be performed for identifying one or more wireless access points in a coverage region; and repeating the acts of identifying, determining, initializing and running the scan trigger timer, and causing the scanning operation to be performed. Preferably, the mobile device operates to refrain from performing scanning operations altogether when the communication signal quality value is greater than a scan trigger threshold value. The scan trigger threshold value may be derived from or calculated based on a previously-received or last-sampled communication signal quality value of the wireless access point sampled at a time when the mobile device chose to reassociate with a different wireless access point of the WLAN.

10 Claims, 5 Drawing Sheets

U.S. PATENT DOCUMENTS

| | | | |
|---|---|---|---|
| 7,596,194 B2 * | 9/2009 | Janky | 375/346 |
| 8,014,354 B2 * | 9/2011 | Eichenberger et al. | 370/330 |
| 8,089,939 B1 * | 1/2012 | Mater et al. | 370/332 |
| 2002/0082010 A1 | 6/2002 | Koorapaty et al. | |
| 2002/0102977 A1 * | 8/2002 | Shi | 455/437 |
| 2003/0008675 A1 | 1/2003 | Willats et al. | |
| 2003/0036354 A1 | 2/2003 | Lee et al. | |
| 2004/0120278 A1 | 6/2004 | Krantz et al. | |
| 2004/0142713 A1 | 7/2004 | Harris et al. | |
| 2004/0205158 A1 | 10/2004 | Hsu | |
| 2004/0259542 A1 | 12/2004 | Viitamaki et al. | |
| 2005/0003765 A1 | 1/2005 | Alfano et al. | |
| 2005/0096053 A1 * | 5/2005 | Liu et al. | 455/439 |
| 2005/0138178 A1 * | 6/2005 | Astarabadi | 709/227 |
| 2005/0281234 A1 | 12/2005 | Kawamura et al. | |
| 2006/0014537 A1 | 1/2006 | Arai et al. | |
| 2006/0046653 A1 | 3/2006 | Kirbas | |
| 2006/0128308 A1 | 6/2006 | Michael et al. | |
| 2006/0128382 A1 | 6/2006 | Kim | |
| 2006/0199538 A1 | 9/2006 | Eisenbach | |
| 2007/0178897 A1 * | 8/2007 | Lagnado et al. | 455/434 |
| 2007/0207841 A1 | 9/2007 | Amerga et al. | |
| 2007/0263558 A1 | 11/2007 | Salomone | |
| 2008/0076430 A1 | 3/2008 | Olson | |
| 2008/0132296 A1 | 6/2008 | Willey | |
| 2008/0167041 A1 | 7/2008 | Wang et al. | |
| 2008/0198811 A1 | 8/2008 | Deshpande et al. | |
| 2009/0010226 A1 * | 1/2009 | Nishimura et al. | 370/331 |
| 2009/0163206 A1 * | 6/2009 | Adatrao et al. | 455/436 |

FOREIGN PATENT DOCUMENTS

| | | |
|---|---|---|
| EP | 1463366 A2 | 9/2004 |
| EP | 1513293 A2 | 3/2005 |
| WO | 2006117587 A1 | 11/2006 |
| WO | 2007016964 A1 | 2/2007 |
| WO | 2009027780 A1 | 3/2009 |

OTHER PUBLICATIONS

Michael Methfessel, "Power Consumption for DECT over WLAN", Innovations for High Performance (IHP)—Microelectronics, 2004.

Aishvarya Kumar Sharma, "A study of WLAN Roaming and its implications for Voice Services", TKK T-110.5190 Seminar on Internetworking, May 2006.

European Search Report for EP Application No. 08172845.3, Dated Jun. 2, 2009.

* cited by examiner

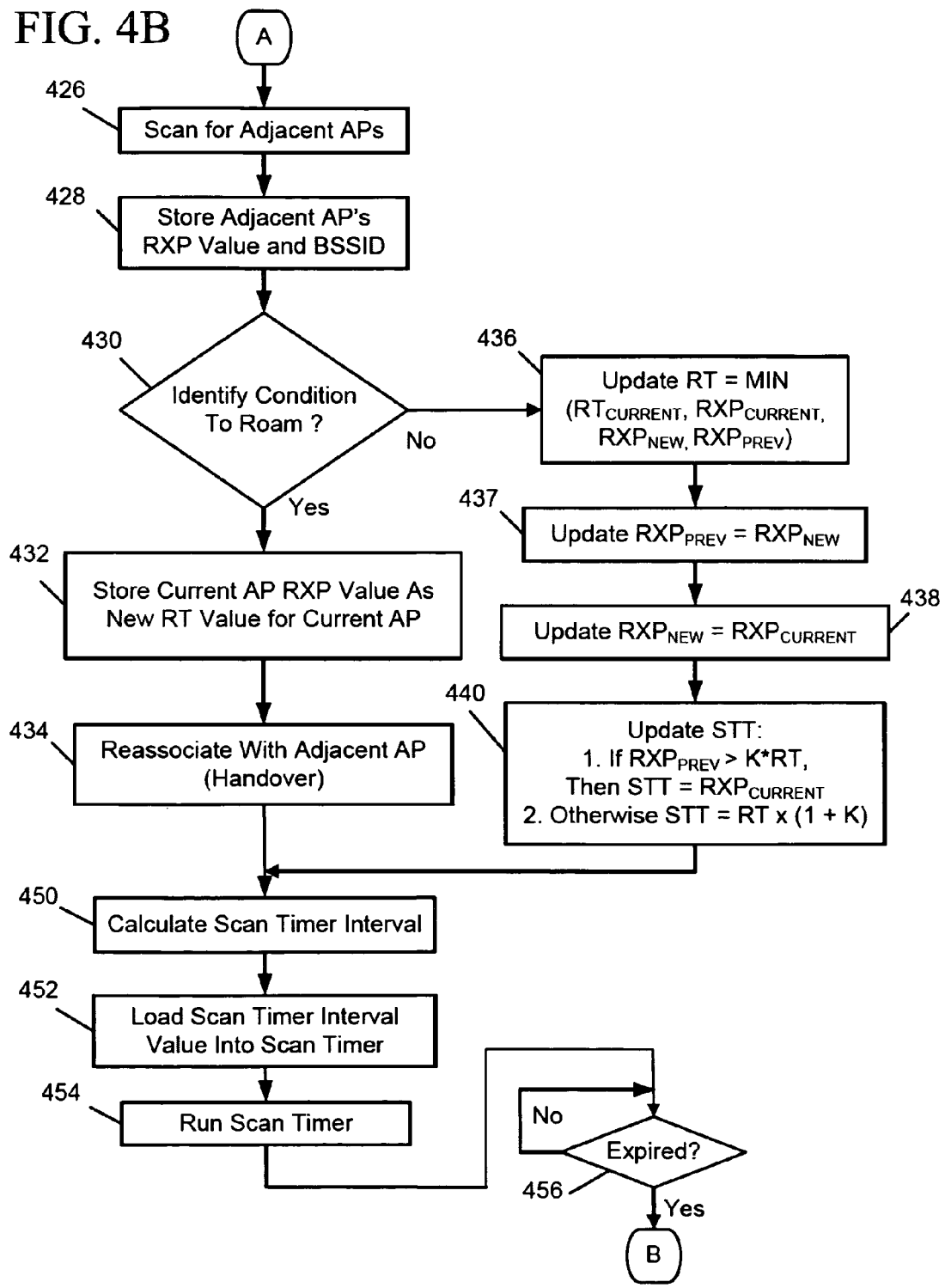

SCANNING METHODS AND APPARATUS FOR MOBILE DEVICES IN WIRELESS LOCAL AREA NETWORKS FOR REDUCED POWER CONSUMPTION

BACKGROUND

1. Field of the Technology

The present disclosure relates generally to mobile communication devices which operate in wireless networks, such as IEEE 802.11-based wireless local area networks (WLANs), and more particularly to techniques for scanning to identify wireless access points (APs) of such WLANs.

2. Description of the Related Art

In wireless communication networks, such as wireless local area networks (WLANs) which operate in accordance with IEEE 802.11-based standards, a mobile communication device regularly scans radio frequency (RF) channels to identify surrounding wireless access points (APs) in WLANs in a process typically referred to as background scanning. Background scanning occurs in the "background" concurrently with other processes of the mobile device and is transparent to the user of the mobile device.

In accordance with IEEE 802.11, scanning may be performed in either a passive scan mode or an active scan mode. The passive scan mode utilizes a wireless receiver of the mobile device to monitor RF channels for a beacon frame from any wireless APs of the WLAN. On the other hand, the active scan mode utilizes a wireless transmitter of the mobile device to transmit a probe request and the wireless receiver to monitor the RF channel for any probe responses from wireless APs of the WLAN.

While regular background scanning is necessary for reliable and seamless communications, battery power consumption is increased when receiver and/or transmitter circuitry of the mobile device is enabled to perform communications functions associated with background scanning.

Accordingly, what are needed are methods and apparatus for mobile communications devices in WLANs to perform scanning processes in such as way as to reduce battery power consumption and increase battery life between charge cycles. The same or similar needs may exist in connection with other environments, networks, and devices.

BRIEF DESCRIPTION OF THE DRAWINGS

Embodiments of present disclosure will now be described by way of example with reference to attached figures, wherein:

FIGS. 4A-4B form a flowchart of a scanning method for use in reducing power consumption of the mobile device operating in the WLAN.

DETAILED DESCRIPTION OF THE PREFERRED EMBODIMENTS

As described herein, one illustrative method for reducing power consumption in a mobile communication device of a wireless local area network (WLAN) involves the steps of identifying a communication signal quality value between the mobile device and a wireless access point of the WLAN with which the mobile device is currently associated; determining an initial timer value based on a predefined relationship with the communication signal quality value where, as the communication signal quality value decreases, the initial timer value correspondingly decreases; initializing a scan trigger timer with the initial timer value and running the scan trigger timer; and upon expiration of the scan trigger timer: causing a scanning operation to be performed for identifying one or more wireless access points in a coverage region; and repeating the acts of identifying, determining, initializing and running the scan trigger timer, and causing the scanning operation to be performed. Preferably, the mobile device operates to refrain from performing scanning operations altogether when the communication signal quality value is greater than a scan trigger threshold value. The scan trigger threshold value may be derived from or calculated based on a previously-received or last-sampled communication signal quality value of the wireless access point sampled at a time when the mobile device chose to reassociate with a different wireless access point of the WLAN.

Figure 1:
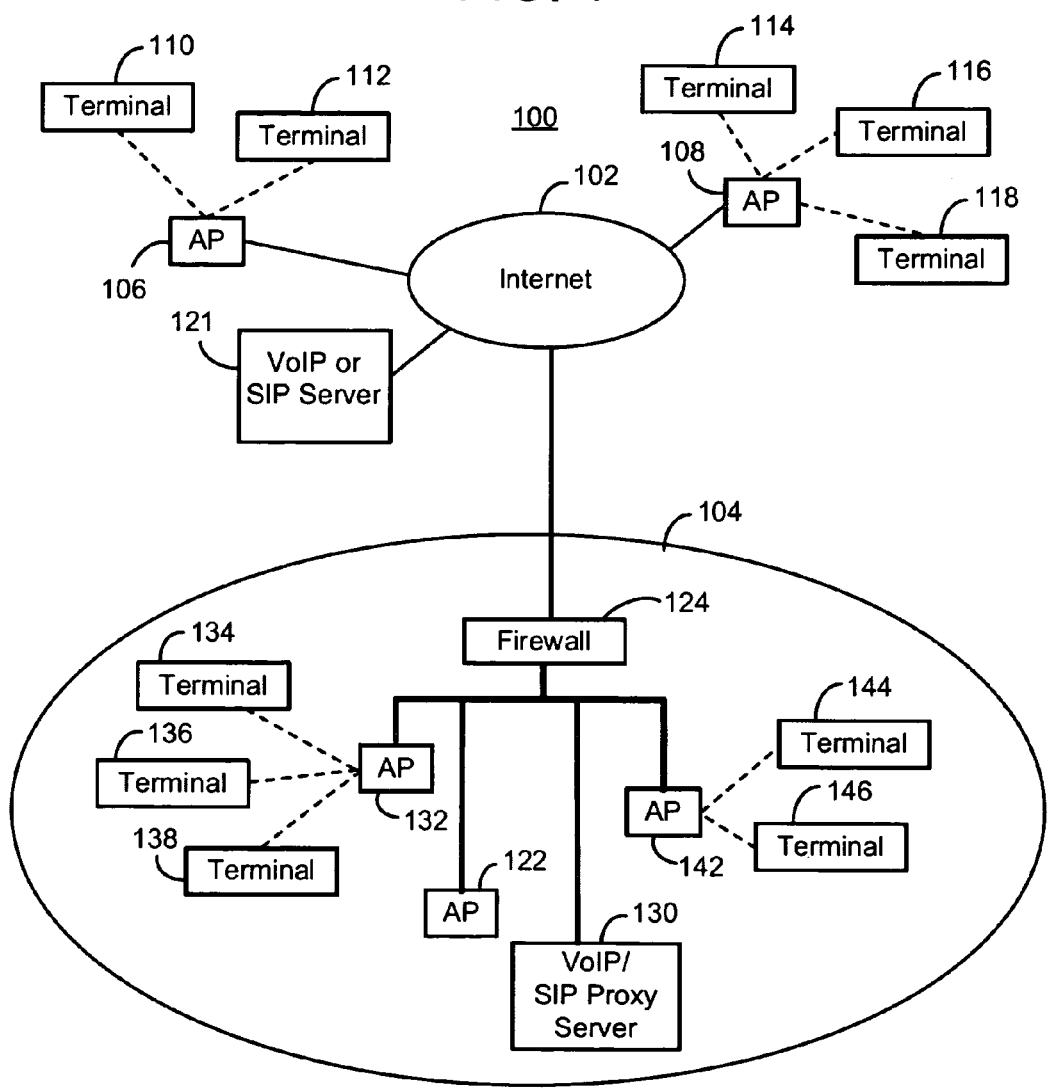
FIG. 1 is a block diagram illustrating a communication system which includes a computer network having a wireless local area network (WLAN)

To illustrate one general network architecture within which the present techniques may be practiced, FIG. 1 shows a communication system 100 which may include a public network 102 (e.g. the Internet), a private network 104, or both. In the present embodiment, private network 104 is or includes a wireless local area network (WLAN). In the WLAN, terminals may associate to their networks through access points (APs) as shown. Preferably, at least some of the APs are wireless APs of the WLAN and at least some of the terminals are mobile/wireless communication devices which interface and connect through these wireless APs. Such terminals and APs may operate in accordance with well-known IEEE 802.11 standards. The terminals shown in public network 102 include terminals 110 and 112 which have interfaced with AP 106, and terminals 114, 116, and 118 which have interfaced with AP 108. The terminals shown in private network 104 include terminals 134, 136, 138 which have interfaced with AP 132, and terminals 144 and 146 which have interfaced with AP 142. Each terminal operating in the WLAN may have the structure of FIG. 2 and operate in accordance with the techniques described in relation to FIGS. 3-4.

Private network 104 which includes the WLAN provides various data and communication services to its terminals. For example, private network 104 may provide for voice telephony communication services for its terminals with use of Voice over IP (VoIP) communications. For these types of services, private network 104 may utilize a VoIP server architecture for VoIP communication sessions and/or an e-mail server architecture for e-mail message communications, as examples. For these purposes, communication system 100 may also include a VoIP or Session Initiation Protocol (SIP) server. In the present embodiment, communication system 100 has a VoIP or SIP server 121 in public network 102, and a VoIP or SIP server 130 in private network 104. Note that some communication applications utilized by terminals, such VoIP applications, require the use of SIP. SIP is well-documented in standard documents such as Request For Comments (RFC) 3261. A firewall 124 may be provided in private network 104 for preventing unauthorized access from users in public network 102.

Figure 2:
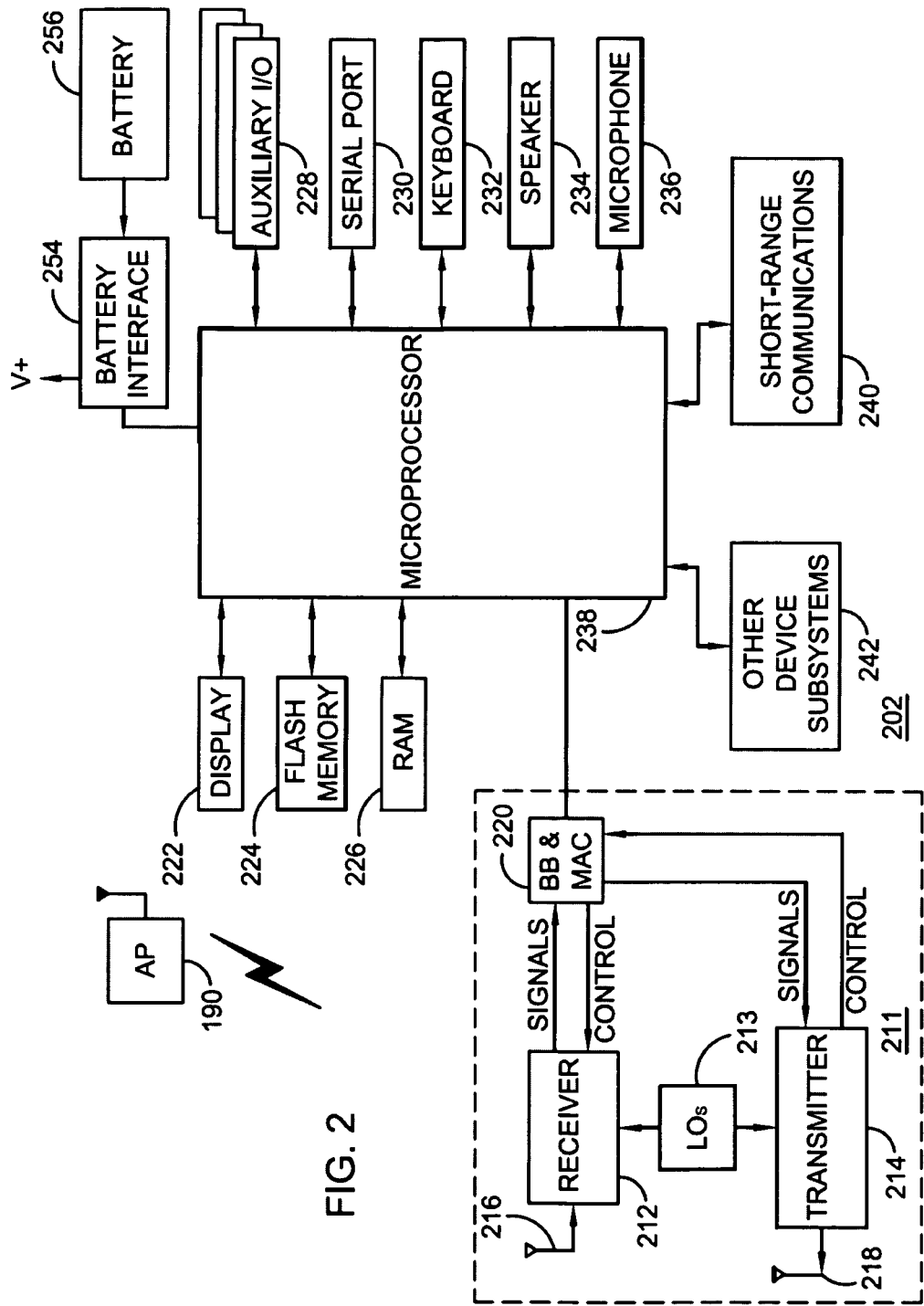
FIG. 2 is a more detailed schematic diagram of a mobile communication device which may operate in the WLAN of FIG. 1, namely, a mobile station of the preferred embodiment.

Referring now to FIG. 2, electrical components of a typical mobile communication device 202 (e.g. a mobile station) which operates with wireless APs of communication system 100 of FIG. 1 will be described. Mobile device 202 may be representative of one or more terminals shown and described in relation to FIG. 1. Mobile device 202 is preferably a two-way communication device having at least voice and advanced data communication capabilities, including the capability to communicate with other computer systems. Also preferably, mobile device 202 is a wireless communication device which operates in accordance with an IEEE 802.11 standards. Depending on the functionality provided by mobile device 202, it may be referred to as a data messaging device, a two-way pager, a cellular-type telephone with data messaging capabilities, a wireless Internet appliance, or a data communication device (with or without telephony capabilities).

As shown in FIG. 2, mobile device 202 is adapted to wirelessly communicate with AP 190 which may be a wireless AP of the present disclosure. For communication with AP 190, mobile device 202 utilizes communication subsystem 211. Depending on the type of device, mobile device 202 may also be adapted to wirelessly communicate with other systems such as cellular telecommunication systems. With such configuration, mobile device 202 may be referred to as a "dual mode" mobile device. Although mobile device 202 may have separate and independent subsystems for these purposes, at least some portions or components of these otherwise different subsystems may be shared where possible. Note, however, that the scanning techniques of the present disclosure do not require that mobile device 202 be any type of dual mode device.

Communication subsystem 211 includes a receiver 212, a transmitter 214, and associated components, such as one or more (preferably embedded or internal) antenna elements 216 and 218, local oscillators (LOs) 213, and a processing module such as a baseband (BB) and media access control (MAC) processing module 220. As will be apparent to those skilled in the field of communications, the particular design of communication subsystem 211 depends on the communication network in which mobile device 202 is intended to operate. In the present disclosure, communication subsystem 211 (including its associated processor/processing components) are operative in accordance with IEEE 802.11 standards.

Mobile device 202 may send and receive communication signals via the WLAN after required procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since mobile device 202 may be a portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides a regulated voltage V to all of the circuitry.

Mobile device 202 includes a microprocessor 238 (one type of processor or controller) that controls overall operation of mobile device 202. This control includes the scanning control techniques of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 202. A predetermined set of applications that control basic device operations, including at least data and voice communication applications, will normally be installed on mobile device 202 during its manufacture. A preferred application that may be loaded onto mobile device 202 may be a personal information manager (PIM) application having the ability to organize and manage data items relating to user such as, but not limited to, e-mail, calendar events, voice mails, appointments, and task items.

The PIM application preferably has the ability to send and receive data items via the wireless network. In a preferred embodiment, PIM data items are seamlessly integrated, synchronized, and updated via the wireless network, with the wireless device user's corresponding data items stored and/or associated with a host computer system thereby creating a mirrored host computer on mobile device 202 with respect to such items. This is especially advantageous where the host computer system is the wireless device user's office computer system. Additional applications may also be loaded onto mobile device 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile device 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications (e.g. involving the use of VoIP or SIP server 121 of FIG. 1), the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication. Short-range communications subsystem 240 of FIG. 2 is an additional optional component that provides for communication between mobile device 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Although a specific mobile device 202 has just been described, any suitable mobile device or terminal may be part of the inventive methods and apparatus which will be described in fuller detail below. Note that many components of mobile device 202 shown and described may not be included (e.g. a full QWERTY keypad may be optional).

Figure 3:
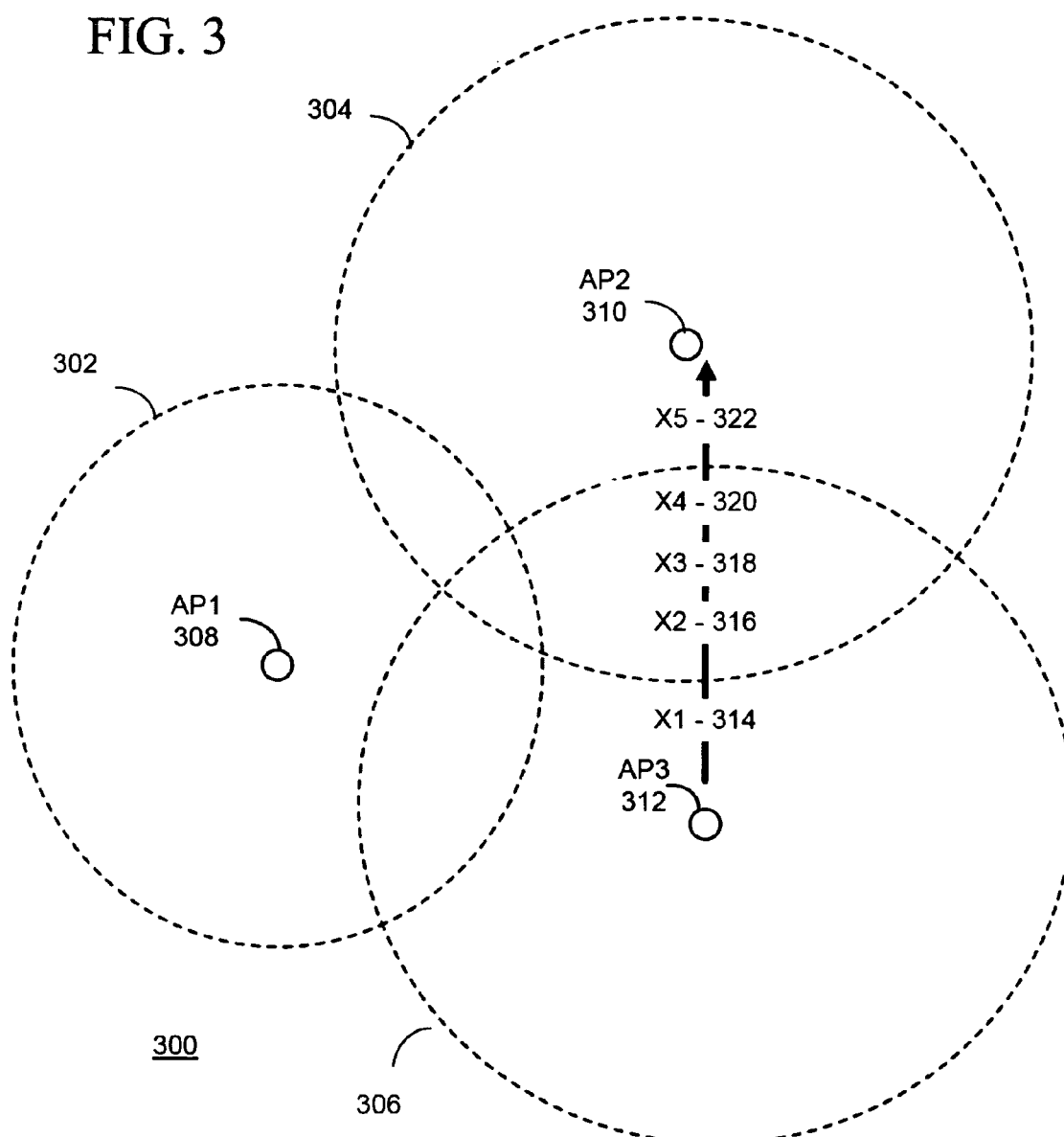
FIG. 3 is a partial plan view illustration of a WLAN radio frequency (RF) coverage map and the mobile device being moved within the WLAN coverage map.

FIG. 3 provides a partial plan view of a WLAN 300 within which scanning techniques of a mobile communication device may be utilized. These scanning techniques are described in more detail later in relation to the flowchart of FIGS. 4A and 4B. WLAN 300 may be part of the communication system as described in relation to FIG. 1. WLAN 300 has a plurality of wireless access points (APs) which together provide at least part of a local radio frequency (RF) coverage area for WLAN 300. In FIG. 3, WLAN 300 is shown to have three wireless APs 308, 310, and 312 (designated "AP1", "AP2", and "AP3", respectively) which provide three separate, but overlapping, RF coverage areas. In actual practice, WLAN systems may include one or more wireless APs, and techniques of the present disclosure are applicable to WLAN systems which have two or more wireless APs.

In FIG. 3, wireless APs 308, 310, and 312 may be described as being adjacent to or neighboring one another. As part of the entire RF coverage area of WLAN 300, wireless AP 308 ("AP1") provides an RF coverage area 302, wireless AP 310 ("AP2") provides an RF coverage area 304, and wireless AP 312 ("AP3") provides an RF coverage area 306. All wireless APs 308, 310, and 312 are fixedly located.

Each RF coverage area has a size that is set based on the assumption that each wireless AP is transmitting signals at a nominal RF transmission power level. Note that the RF coverage area of WLAN 300 contains some areas that are covered by two or more of RF coverage areas 302, 304, and 306. These areas are commonly referred to as overlap areas within WLAN 300. Circular RF coverage areas shown in the diagram estimate an ideal unobstructed radiation pattern for an omni-directional antenna driven by an RF transmitter.

When within the RF coverage area of WLAN 300, mobile devices are provided with wireless communications and may access communication services within the network associated with WLAN 300. Outside of the RF coverage area of WLAN 300, the mobile devices may not be able to communicate through or access services of the network. WLAN 300 and mobile devices in communications with it may operate according to IEEE 802.11-based communication standards.

During normal operating conditions for a mobile device of WLAN 300, a scanning procedure of the mobile device is performed in order to regularly monitor usable RF channels of surrounding wireless APs and/or WLANs. The object is to regular identify and operate with the "best" wireless AP in WLAN 300 for seamless communications, given that the mobile device is indeed mobile and may be moved by its user. The scanning procedure typically operates with no indication to a user of the mobile device, and may operate while user-viewable processes are active, and therefore may be described as a "background" scanning procedure.

Such scanning may be performed in either a passive scan mode or an active scan mode. The passive scan mode utilizes the receiver of the mobile device to monitor RF channels for a beacon frame from wireless APs of WLAN 300. On the other hand, the active scan mode utilizes the transmitter of the mobile device to transmit a probe request and the receiver to monitor the RF channel for any probe responses from wireless APs of WLAN 300.

As apparent, monitoring or scanning of an RF channel in the background causes activation of circuitry of the mobile device in order to process signaling messages (e.g. probe requests, probe responses, beacon frames, etc.), measure and/or determine receive signal strength values, identify wireless networks, and store received information from WLANs in the area. The activated circuitry may include the receiver, transmitter, the MAC processing module, or portions thereof. Activation of the circuitry required for background scanning may undesirably increase battery power consumption within the mobile device.

System performance provided to the mobile device within WLAN 300 is compromised when the receive signal strength value corresponding to wireless AP 312 decreases to a level that decreases the signal-to-noise ratio, affecting bit error rate, quality of signal, and communication integrity between the mobile device and the wireless AP with which the mobile device is associated. Weak signal measurements associated with the current wireless AP 312 may cause a reassociation to another adjacent wireless AP 310 within WLAN 300, or perhaps with a wireless AP of a different WLAN.

Location markers 314, 316, 318, 320, and 322 indicate different physical locations (e.g. X1, X2, X3, X4, and X5, respectively) of a mobile device which is moving within WLAN 300. In FIG. 3, the mobile device is initially associated with and positioned near wireless AP 312 (AP3), and subsequently travels away from wireless AP 312 towards wireless AP 310 (AP2). Receive signal strength values of wireless AP 312 measured at the mobile device are typically the largest when the mobile device is positioned physically close to wireless AP 312. Conversely, the receive signal strength values of wireless AP 312 are typically the smallest when the mobile device is at the outside perimeter of RF coverage area 306 of wireless AP 312. Specifically, in FIG. 3, receive signal strength values measured by the mobile device with respect to wireless AP 312 are the largest while positioned at location marker 314 (X1), and the smallest while positioned at location marker 322 (X5). Thus, the increased distance between the mobile device and wireless AP 312 causes an increase in RF path loss between the mobile device and wireless AP 312, which causes a corresponding decrease in receive signal strength value measured at the mobile device.

In the example WLAN 300, the mobile device positioned at location marker 314 receives RF signals suitable for communications from wireless AP 312 only. At location markers 316, 318, and 320, the mobile device receives suitable RF signals from both wireless AP 312 and wireless AP 310. Receive signal strength values corresponding to wireless AP 312 typically decreases as the mobile device travels from location marker 316 to location marker 318, from location marker 318 to location marker 320, and so on. On the other hand, since the mobile device is traveling towards wireless AP 310, receive signal strength values provided by wireless AP 310 typically increase as the mobile device travels from location marker 316 to location marker 318, from location marker 318 to location marker 320, from location marker 320 to location marker 322, and so on. Note that the mobile device may reassociate from wireless AP 312 to wireless AP 310 while the mobile device is located at any of the three location markers 316, 318, and 320, depending on specific system performance or other specific conditions.

According to techniques of the present disclosure, the frequency of scanning operations of the background scanning performed by the mobile device is dynamically adjusted based on the communication signal quality value of the wireless AP that the mobile device is currently associated with. Depending on the specific environment and embodiments employed, the communication signal quality value may be or is based on a receive signal strength value, such as a Received Signal Strength Indication (RSSI), a signal-to-noise ratio (SNR), a Bit Error Rate (BER), etc. In the description that follows, the communication signal quality value may be referred to as a receive signal strength value.

Again with reference to FIG. 3, the mobile device is illustrated as being moved from location markers 314 through 322, continually away from wireless AP 312 with which it is associated. At location marker 314 (i.e. very close to wireless AP 312), the mobile device identifies a relatively strong receive signal strength value for wireless AP 312, and therefore may (repeatedly) initialize a scan trigger timer with a relatively high value (e.g. $T_{314}$) so that background scanning is performed very seldom (if at all). Conversely, at location marker 320 (i.e. near the fringe of RF coverage area 306), the mobile device identifies a relatively weak receive signal strength value for wireless AP 312, and therefore may (repeatedly) initialize the scan trigger timer with a relatively low value (e.g. $T_{322} \ll T_{314}$) so that background scanning is performed relatively often. In between location markers 314 and 320 (i.e. from location markers 314, 316, 318, to 320), the mobile device identifies continually decreasing receive signal strength values for wireless AP 312, and therefore may initialize the scan trigger timer to ever decreasing values. As apparent, the initial value of the scan trigger timer is set based on a predetermined relationship with the receive signal strength value where, as the receiver signal strength value decreases, the initial value of the scan trigger timer correspondingly decreases.

The mobile device may further operate to refrain from performing background scanning altogether when the communication signal quality value is greater than a scan trigger threshold value or "STT" value. The scan trigger threshold value may be derived from or calculated based on a previously-received or last-sampled communication signal quality value of the wireless access point, sampled at a time when the mobile device chose to reassociate with a different wireless access point of the WLAN. In relation to FIG. 3, receive signal strength values measured at the mobile device while located at location marker 314 will be in most cases greater than the scan trigger threshold value. Receive signal strength values greater than this scan trigger threshold value cause the background scanning of the present disclosure to cease or be idle. As the mobile device proceeds in a direction away from wireless AP 312, the receive signal strength value decreases. When the mobile device is located at location marker 316, for example, the receive signal strength values may still be greater than the scan trigger threshold value to maintain the idle state of the background scanning. When the mobile device is located at location marker 318 or 320, for example, the receive signal strength value drops below the scan trigger threshold value which may trigger the running of the scan timer and background scanning.

Figure 4A:
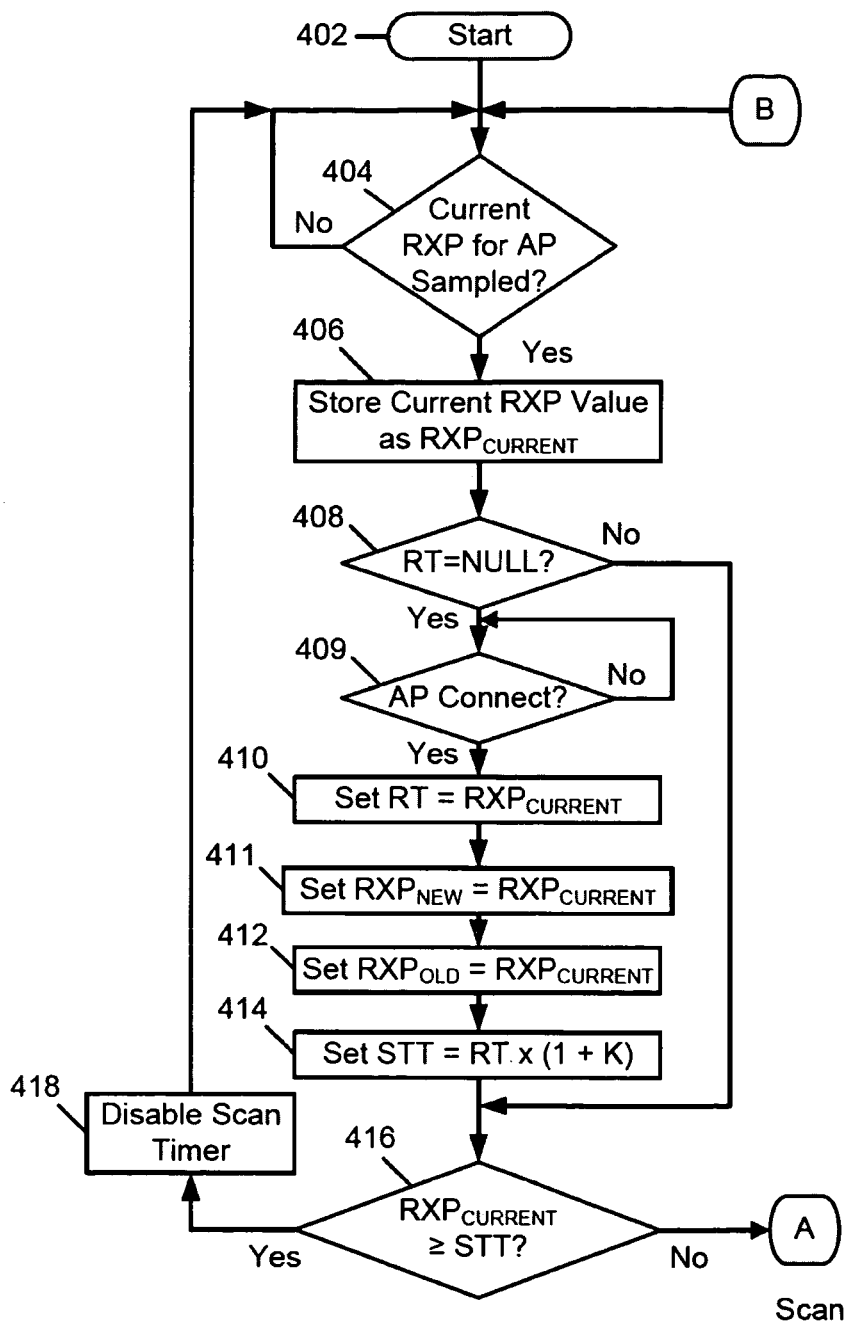

FIGS. 4A-4B form a flowchart for describing a method of reducing scanning processes as a way to reduce battery power consumption and increase battery life in mobile devices of a WLAN. The following technique of FIGS. 4A-4B may be embodied in a mobile device operative for communications in a WLAN as described earlier above. The method of FIGS. 4A-4B may be embodied at least in part as a computer program product which includes a computer readable medium (e.g. memory, such as FLASH memory, or a computer disk, etc.) and computer instructions stored in the computer readable medium which are executable by one or more processors of the mobile device for performing the method.

The variables utilized and stored in memory of the mobile device as described in flowchart of FIGS. 4A-4B are identified in advance as follows:

RXP=receiver power strength;
$RXP_{CURRENT}$=current measured receiver power strength;
$RXP_{LAST}$=most recently stored receiver power strength;
$RXP_{PREV}$=previously stored receiver power strength (just prior to $RXP_{LAST}$);
RT=reassociation threshold; the RXP at the time the mobile device previously reassociated with an adjacent wireless AP;
STT=scan trigger threshold; a threshold RXP value for triggering the mobile device to set and run a scan timer for scanning; and
K="safety factor" constant, where 0>K>1 (e.g. range of 0.10 to 0.50, such as 0.25).

Note that RT and STT are variables which are kept on a per AP basis; that is, the mobile device keeps a different set of RT and STT variables for each wireless AP of the WLAN (e.g. $RT_1$ and $STT_1$ for AP1; $RT_2$ and $STT_2$ for AP2; $RT_3$ and $STT_3$ for AP3, etc.). Memory stores for RXP, $RXP_{CURRENT}$, $RXP_{LAST}$, and $RXP_{PREV}$ may also be kept on a per AP basis if desired. Note further that each wireless AP is uniquely associated with a basic service set identifier (BSSID) with which the variables may be stored.

Beginning at a start block 402 of FIG. 4A, the mobile device (e.g. its processor or controller) identifies if a current receive signal strength value (i.e. RXP) of the wireless AP with which the mobile device is currently associated has been sampled (step 404 of FIG. 4A). If no current RXP level has yet been sampled as identified in step 404, the processor continues monitoring for such value. When the current RXP level has been sampled as identified in step 404, the current RXP level may be stored in a memory location, for example, as $RXP_{CURRENT}$ (step 406 of FIG. 4A). Such sampling may occur regularly and repeatedly at a predetermined time period, such as every ten (10) seconds. The processor then determines whether the reassociation threshold (RT) or other variable(s) associated with the current wireless AP have been initialized and contains a valid value (step 408 of FIG. 4A). Note that variables may be zero or invalid if the mobile device has newly encountered a new wireless AP. If the RT is invalid at step 408, and a connection with the wireless AP has been established (step 409 of FIG. 4A), the processor initializes the variables for scanning (e.g. steps 410, 411, 412, and 414 of FIG. 4A). For example, the processor may set $RT=RXP_{CURRENT}$ (step 410 of FIG. 4A), $RXP_{LAST}=RXP_{CURRENT}$ (step 411 of FIG. 4A), $RXP_{PREV}=RXP_{CURRENT}$ (step 412 of FIG. 4A), and the scan trigger threshold (STT) at a predefined value that is greater than the RT (step 414 of FIG. 4A).

When the variables are properly initialized or established (i.e. from "NO" branch of step 408, or from step 414), the processor advances to step 416 of FIG. 4A. If $RXP_{CURRENT}$ is greater than or equal to the STT for the wireless AP (step 416 of FIG. 4A), which indicates a relatively strong RXP level, the scan timer is or remains disabled (step 418 of FIG. 4A) and the process loops back to step 404. In this case, the signal strength is sufficiently good so that background scanning is deemed unnecessary and power consumption in the mobile device is conserved.

On the other hand, if $RXP_{CURRENT}$ is less than the STT in step 416, processing proceeds through connector A to FIG. 4B where a system scan for wireless APs is performed (step 426 of FIG. 4B) by the processor using the receiver/transmitter. Such scanning is followed by memory storage of RXP values with BSSIDs pertaining to each detected wireless AP (step 428 of FIG. 4B). The mobile device then identifies whether any conditions are present to switch (roam) to another different wireless AP and, if so, which adjacent wireless AP should be selected (step 430 of FIG. 4B). The mobile device may use any suitable selection or roaming algorithm, conventional or otherwise, in step 430. For example, if the RXP value of the current wireless AP is less than an RXP value of any adjacent wireless AP, the processor may determine that a reassociation should occur with an adjacent wireless AP having a larger or the largest RXP.

If a roaming condition is present as identified in step 430, then the mobile device initiates the switching or roaming to an adjacent wireless AP, proceeding to steps 432 and 434. The processor stores the $RXP_{CURRENT}$ of the currently-associated wireless AP as the updated RT value (step 432 of FIG. 4B). Alternatively in step 432, the processor selects the greater of the current RT value and the $RXP_{CURRENT}$ of the currently-associated wireless AP, and stores this greater value as the updated RT value. Next, the processor causes the handover (reassociation) to take place with the newly selected wireless AP (step 434 of FIG. 4B).

If, however, no roaming condition is present in step 430, then the mobile device remains connected with the current wireless AP and updates the variables associated with the current wireless AP in steps 436, 437, 438, and 440. In particular, the RT for the current wireless AP is updated to be equal to the minimum value taken from the current RT value, $RXP_{CURRENT}$, $RXP_{LAST}$, or $RXP_{PREV}$ (step 436 of FIG. 4B).

In addition, $RXP_{PREV}=RXP_{LAST}$ (step 437 of FIG. 4B), $RXP_{LAST}=RXP_{CURRENT}$ (step 438 of FIG. 4B), and the STT is updated (step 440 of FIG. 4B). STT is updated to a value that will be greater than or equal to $RXP_{CURRENT}$. Specifically, the following update for the STT may be employed: if $RXP_{PREV}>K*RT$, then $STT=RXP_{CURRENT}$; otherwise, $STT=RT*(1+K)$. This particular updating of the STT takes into account the speed at which the mobile device is moving.

Whether or not reassociation has occurred, after step 434 or step 440, steps 450, 452, 454, 456 of FIG. 4B are performed so that background scanning can be initiated in the future, at a time that will depend on the scan interval. A scan timer interval value is calculated for setting the scan timer interval (step 450 of FIG. 4B). When initialized, the scan timer interval value is a value between a maximum timer value and a minimum timer value, where the maximum timer value is proportional to a relatively strong RXP value and the minimum timer value is proportional to a relatively weak RXP value. Maximum and minimum timer values may be predefined and vary depending on application and communications techniques used. The scan timer interval determines an amount of time between system scans, so that a stronger RXP level dictates a larger scan interval timer value and reduces the scanning frequency of the mobile device. Conversely, a weaker RXP level dictates a smaller scan interval timer value and increases the scanning frequency of the mobile device. Once determined, the scan timer interval value is loaded into a scan timer (step 452 of FIG. 4B) and the scan timer is set to run (step 454 of FIG. 4B). As apparent, the scan timer interval value, as calculated, serves as an initial timer value for the scan timer. The scan timer runs until its expiration (step 456 of FIG. 4B), where the flowchart returns through connector B to step 404 of FIG. 4A.

Note that the process variables described herein may be stored in a dynamically-updated table illustrated in Table 1 below.

TABLE 1

Process Variables Associated With Background Scanning Of The Present Disclosure.

| BSSID | RT | STT | $RXP_{CURRENT}$ | $RXP_{LAST}$ | $RXP_{PREV}$ |
|---|---|---|---|---|---|
| 1 | $RT_1$ | $RT_1$ | $RXP_{CURRENT1}$ | $RXP_{LAST1}$ | $RXP_{PREV1}$ |
| 2 | $RT_2$ | $RT_2$ | $RXP_{CURRENT2}$ | $RXP_{LAST2}$ | $RXP_{PREV2}$ |
| 3 | $RT_3$ | $RT_3$ | $RXP_{CURRENT3}$ | $RXP_{LAST3}$ | $RXP_{PREV3}$ |
| ... | ... | ... | ... | ... | ... |

Again, the variables RT and STT are dynamic (change throughout operation) and are uniquely associated with the wireless AP with which the mobile device is currently associated. In addition, variables $RXP_{CURRENT}$, $RXP_{NEW}$ and $RXP_{OLD}$ are also dynamic (change throughout operation) and may be uniquely associated the current wireless AP. Note that, alternatively, unique values (e.g. RT, STT) may be stored in association with each pair of current and adjacent wireless APs, to account for non-equidistant wireless AP coverage areas.

As previously described, the RT is used to derive or calculate the updated STT value (see step 440 above) that is uniquely associated with the wireless AP. Note that the step of assigning RT equal to a minimum value of $RXP_{CURRENT}$, $RXP_{LAST}$ or $RXP_{PREV}$ (see step 436 above) effectively causes the reassociation threshold to adapt and converge on a usable threshold value that will be representative of a suitable, relatively low receive signal strength value of the wireless AP coverage area. Since the RT determines the STT, the present techniques allow for adaptive and dynamic updates to the process for accuracy and refinement. Such techniques effectively decrease background scanning processes during adequate receive signal strength value conditions, allowing such processes to be active only while a mobile device is located in the outer regions of the wireless AP RF coverage area.

As described earlier, the communication signal quality value utilized in the present techniques was referred to as a receive signal strength value. Depending on the specific environment and embodiments employed, however, the communication signal quality value may be or be based on RSSI, SNR, BER, or other suitable value or combination of values.

Thus, as described herein, an illustrative method for reducing power consumption in a mobile device of an WLAN involves the steps of identifying a communication signal quality value between the mobile device and a wireless access point of the WLAN with which the mobile device is currently associated; determining an initial timer value based on a predefined relationship with the communication signal quality value where, as the communication signal quality value decreases, the initial timer value correspondingly decreases; initializing a scan trigger timer with the initial timer value and running the scan trigger timer; and upon expiration of the scan trigger timer: causing a scanning operation to be performed for identifying one or more wireless access points in a coverage region; and repeating the acts of identifying, determining, initializing and running the scan trigger timer, and causing the scanning operation to be performed. Preferably, the mobile device operates to refrain from performing scanning operations altogether when the communication signal quality value is greater than a scan trigger threshold value. The scan trigger threshold value may be derived from or calculated based on a previously-received or last-sampled communication signal quality value of the wireless access point sampled at a time when the mobile device chose to reassociate with a different wireless access point of the WLAN.

The above-described embodiments of the present disclosure are intended to be examples only. Those of skill in the art may effect alterations, modifications and variations to the particular embodiments without departing from the scope of the application. The same or similar needs and solutions may exist in connection with other environments, networks, and devices. For example, the WLANs may be based on WiMAX technology or other suitable wireless technologies. The invention described herein in the recited claims intends to cover and embrace all suitable changes in technology.

What is claimed is:

1. A method for use in a mobile communication device for communicating in a wireless local area network (WLAN), the method comprising:
  associating with and communicating via a first wireless access point of the WLAN;
  ceasing communication with the first wireless access point and roaming onto a second wireless access point;
  sampling a communication signal quality value of RF signals between the mobile communication device and the first wireless access point, the communication signal quality value being sampled when the mobile communication device ceased communication with the first wireless access point and roamed onto the second wireless access point;
  deriving a scan trigger threshold value for the first wireless access point based on the communication signal quality value;
  storing in memory the scan trigger threshold value in association with a base service set identifier (BSSID) of the first wireless access point;
  again associating with and communicating via the first wireless access point of the WLAN;
  identifying a new communication signal quality value of RF signals between the mobile communication device and the first wireless access point;
  comparing the new communication signal quality value and the stored scan trigger threshold value which is identified from the memory based on the BSSID received from the first wireless access point;
  when the new communication signal quality value is less than the scan trigger threshold value, regularly performing a scanning operation to identify wireless access points;
  when the communication signal quality value is greater than the scan trigger threshold value, refraining from regularly performing the scanning operation; and
  updating the stored scan trigger threshold value associated with the BSSID of the first wireless access point based on an updated communication signal quality value, the updated communication signal quality value being sampled when the mobile communication device again ceased communication with the first wireless access point and roamed onto the second wireless access point.

2. The method of claim 1, wherein each scanning operation is regularly performed by:
  determining an initial timer value based on a predefined relationship with the communication signal quality value of the first wireless access point where, as the communication signal quality value decreases, the initial timer value correspondingly decreases;
  initializing a scan trigger timer with the initial timer value and running the scan trigger timer; and
  upon each expiration of the scan trigger timer: causing the scanning operation to be performed.

3. The method of claim 1, further comprising:
  deriving the scan trigger threshold value based on the communication signal quality value by setting the scan trigger threshold value to be equal to the communication signal quality value.

4. The method of claim 1, wherein the WLAN comprises an IEEE 802.11-based network.

5. A mobile communication device, comprising:
  a radio frequency (RF) transceiver;
  one or more processors coupled to the RF transceiver;
  memory coupled to the one or more processors;
  the one or more processors being configured to:
    associate with and communicate via a first wireless access point of a wireless local area network (WLAN) using the RF transceiver;
    cease communication with the first wireless access point and roam onto a second wireless access point;
    sample a communication signal quality value of RF signals between the mobile communication device and the first wireless access point, the communication signal quality value being sampled when the mobile communication device ceased communication with the first wireless access point and roamed onto the second wireless access point;
    derive a scan trigger threshold value for the first wireless access point based on the communication signal quality value;
    store in the memory the scan trigger threshold value in association with a base service set identifier (BSSID) of the first wireless access point;

again associating with and communicating via the first wireless access point of the WLAN;

identify via the RF transceiver a new communication signal quality value of RF signals between the mobile communication device and the first wireless access point;

compare the new communication signal quality value and the stored scan trigger threshold value which is identified from the memory based on the BSSID received from the first wireless access point;

when the new communication signal quality value is less than the scan trigger threshold value, regularly perform a scanning operation to identify wireless access points;

when the communication signal quality value is greater than the scan trigger threshold value, refrain from regularly performing the scanning operation; and update the stored scan trigger threshold value associated with the BSSID of the first wireless access point based on an updated communication signal quality value, the updated communication signal quality value being sampled when the mobile communication device again ceased communication with the first wireless access point and roamed onto the second wireless access point.

6. The mobile communication device of claim 5, wherein each scanning operation is regularly performed by:

determining an initial timer value based on a predefined relationship with the communication signal quality value of the first wireless access point where, as the communication signal quality value decreases, the initial timer value correspondingly decreases;

initializing a scan trigger timer with the initial timer value and running the scan trigger timer; and upon each expiration of the scan trigger timer, causing the scanning operation to be performed.

7. The mobile communication device of claim 5, further comprising
a cellular telephone.

8. The mobile communication device of claim 5, wherein the RF transceiver is configured for IEEE 802.11 communications.

9. The mobile communication device of claim 5, wherein the one or more processors are further configured to derive the scan trigger threshold value based on the communication signal quality value by setting the scan trigger threshold value to be equal to the communication signal quality value.

10. A mobile communication device, comprising:
a radio frequency (RF) transceiver;
one or more processors coupled to the RF transceiver;
memory coupled to the one or more processors;
the one or more processors being configured to:
associate with and communicate via a first wireless access point of a wireless local area network (WLAN) using the RF transceiver;

cease communication with the first wireless access point and roam onto a second wireless access point;

sample a communication signal quality value of RF signals between the mobile communication device and the first wireless access point, the communication signal quality value being sampled when the mobile communication device ceased communication with the first wireless access point and reamed onto the second wireless access point;

set a scan trigger threshold value for the first wireless access point to be equal to the communication signal quality value;

store in the memory the scan trigger threshold value in association with a base service set identifier (BSSID) of the first wireless access point;

again associating with and communicating via the first wireless access point of the WLAN;

identify via the RF transceiver a new communication signal quality value of RF signals between the mobile communication device and the first wireless access point;

compare the new communication signal quality value and the stored scan trigger threshold value which is identified from the memory based on the BSSID received from the first wireless access point;

when the new communication signal quality value is less than the scan trigger threshold value, regularly perform a scanning operation to identify wireless access points; and when the communication signal quality value is greater than the scan trigger threshold value, refrain from regularly performing the scanning operation.

* * * * *